June 3, 1969

P. D. BARTLETT 3,447,436

INSTRUCTIONAL CAMERA

Filed Dec. 14, 1966

INVENTOR.
Philip D. Bartlett
BY
Brown and Mikulka
ATTORNEYS

United States Patent Office 3,447,436
Patented June 3, 1969

3,447,436
INSTRUCTIONAL CAMERA
Philip D. Bartlett, Medfield, Mass., assignor to Polaroid Corporation, Cambridge, Mass., a corporation of Delaware
Filed Dec. 14, 1966, Ser. No. 601,670
Int. Cl. G03b *17/52*
U.S. Cl. 95—13                                6 Claims

ABSTRACT OF THE DISCLOSURE

A self-developing type of camera for instructional use which is composed of several knockdown sections adapted to separation and differential reassemblage for the purpose of demonstrating, through various methods of photography, a plurality of laboratory experiments.

---

The camera of the present invention and film materials used therewith relate to cameras and film materials of the type sold by Polaroid Corporation, Cambridge, Mass., U.S.A. As such, the film material includes a releasably-confined processing liquid and the camera incorporates a pair of pressure rolls between which the film, after its exposure, is drawn and compressed to release and spread the liquid throughout a photosensitive component. More particularly, the film material preferred for use with the present camera is a cut film supplied as a film pack. This type of film enables finished prints to be obtained with utmost rapidity because processing can be completed after withdrawal of the compresed film unit from the camera without impeding the next exposure. The camera is adapted to produce finished prints in either black-and-white or full color. A high-contrast black-and-white film, sold by Polaroid Corporation having an ASA speed of 3000 and producing prints of approximately 3¼ x 4¼ inches is particularly suitable for photographing laboratory experiments of the type contemplated.

Although the camera may be used to photograph conventional subject matter, its primary function may be considered as that of photographically recording various scientific experiments, set-up assemblies or procedures, and the like. It is envisioned that such usage may primarily be at the secondary school or junior college level, although not necessarily limited thereto. Assuming its application to a course in physics, parameter values can be obtained almost immediately by direct measurement from the photographic print. The experiments may, for instance, encompass interrelated parameters of displacement, velocity, acceleration and time. Such an experiment might, by way of example, involve the photographing of a stroboscopically-illuminated moving object. Or, alternatively, the object could be a flashing neon light source undergoing translational movement. A further technique might relate to the photographing of a moving continuous source of direct or reflected light which is interrupted or "chopped" by supplementary means positioned adjacent to the camera lens to produce a point-by-point record of displacement versus time. The camera is provided with accessories enabling various magnifications as well as pin-hole photography. Again, the camera possesses structure making it readily convertible to perform so-called "lensless" or "shadow" photography, such as the photographing of diffraction patterns.

In accordance with the foregoing considerations, objects of the invention are to provide camera apparatus of a type adapted to both expose and process film materials carried thereby and especially adapted to photograph and record for study and measurement purposes subject matter involved in laboratory experiments of a school physics program; to provide a camera of the character described which possesses structural conversion features making possible a wide scope of usage; to provide a versatile camera of the aforementioned type which is of simple structure and easily operated by students of average capabilities; to provide a camera having interchangeable lens and other components for obtaining various ratios of image-to-object and for enabling pin-hole photography; and to provide a camera which incorporates a movable opaque baffle or screen and a removable front which together permit "lensless" photography.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing wherein.

Figure 1:
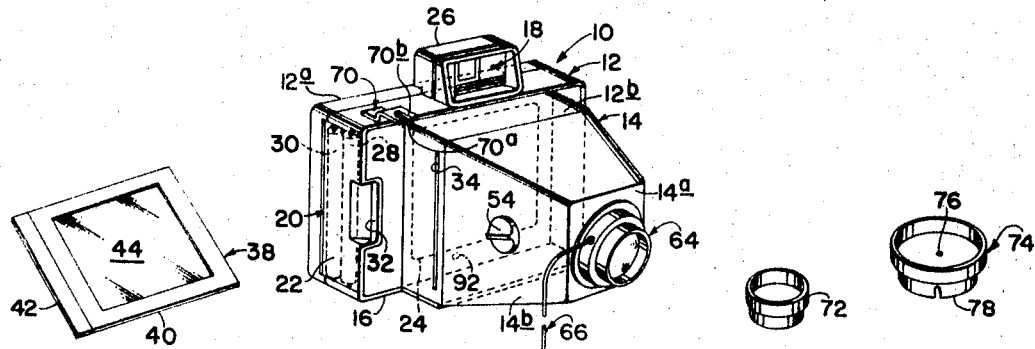
FIGURE 1 is a diagrammatic front view, in perspective, of the camera and accessories.

Referring now ot FIGURE 1, the camera 10 of the invention is shown from the front and at a condition or order of assembly capable of producing, for example, a 10:1 ratio of image to object. The camera comprises a back section 12 and a front section 14. The back section includes a generally-rectangular enclosing housing 16 composed of a metal such as aluminum or an opaque plastic. One plastic material suitable for the purpose is, for example, that known as "Acrylafil," sold by Fiberfil, Inc., Evansville, Ind., U.S.A. Assuming the preferred use therewith of a film pack, as above-mentioned, the latter is loaded in the camera back 12 by pivoting a section 12a of the latter open by means of a hinge extending transversely across the back at 18. After removal of a protective cover sheet of the film pack through a slot at 20, underlying the pivotal cover portion 22, the foremost film unit will be located at a focal plane 24, in readiness for photographic exposure.

The camera back 12 also includes a viewfinder 26 and a pair of pressure rolls 28 and 30, between which each exposed film unit is drawn after its exposure at the focal plane and compressed to release a processing liquid from a frangible container thereof. A slot at 32 permits a plurality of leading draw-tabs of the film pack to protrude therethrough. Each draw-tab is used to superimpose an exposed film emulsion with an image-receiving layer and to initiate entrance of a film unit between the pressure rolls. Thereafter, the leading edge of the film unit is grasped at the slot 20 and the unit is drawn completely through the pressure rolls and exteriorly of the camera.

Figure 2:
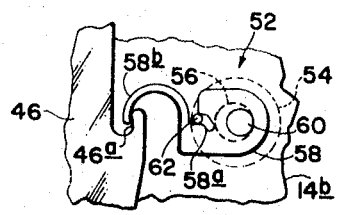
FIG. 2 is a diagramamtic side view of a latch component for holding the front and rear camera sections in assembled relation.

The camera back additionally comprises a rectangular forwardly-extending hollow section 12b. This section includes an elongated slot 34 having associated guide means 36 for slidably mounting an opaque rectangular baffle 38. The baffle includes a planar support element 40, a tab 42 for manually inserting or withdrawing the baffle through the slot 34 and an optical screen 44 composed, for example, of a while matte paper, a beaded material, or the like affixed to its front surface. When the baffle is completely inserted, as shown in FIG. 2, it serves to protect the photosensitive emulsion of any film until positioned at the focal plane 24 from inadvertent exposure to ambient light. It further and importantly serves an imaging function, to be described below. Completing the camera back, is a pair of forwardly-disposed fixed latch members 46, each having a recessed portion 46a which is adapted to be engaged by complementary latching means of the front section 14, to be described, and recessed flange means 48 for firmly engaging complementary flange means of the front section. The terms "front" and "rear," "forwardly" and "rearwardly," etc., as employed herein, refer to the adjacency of remoteness of the part mentioned with respect to the front of the camera.

The camera front section 14 is a hollow, four-sided element composed, for example, of a plastic material such as that, above mentioned, of the rear section, having an open rear face and tapering toward its front surface 14a. It includes a pair of stepped rearwardly-projecting flanges 50 surrounding its open faces for mating with and providing a light-tight seal with the flanges 48 of the camera back. A movable latching element 52 is mounted on each tapered side-wall 14b of the front section for engaging the fixed latching elements 46 of the camera back section 12. Each of the latching elements 52 includes an actuating knob 54 fixedly attached to an axial shaft 56 which in turn, is rotatably mounted in a perforation of the side-wall 14b. A small metallic plate 58 is mounted fixedly and eccentrically on the inner extremity of the shaft 56 by a stud 60. The plate 58 includes a slot 58a formed therein, which curves inwardly so as to be approximately tangent a projection of the shaft 56. The plate also includes an integral, somewhat-resilient hooked appendage 58b. A pin 62 fixedly mounted on the inner surface of the side-wall 14b is adapted to be slidably engaged by the sides of the slot 58a. Operation of the latch 52 is generally as follows. When, as shown in the latched condition of components of FIG. 2, the knob 54 is rotated in a clockwise direction, the eccentrically-mounted plate 58 is also rotated clockwise and is moved slightly to the left, thus releasing the hook 58b from engagement with the surface 46a. At the same time, the inner extremity of the slot 58a is brought into contact with the pin 62 thus holding the latch 52 at open or disengaged position.

Assuming both of the two latching elements 52 to have been manually actuated to provide the unlatching operation above described, the camera front section 14 can now be removed by merely separating the engaged flanges 48 and 50, manually. If however, a photosensitive film unit is positioned at the focal plane 24, the opaque slide or baffle 38 should first be inserted in the slot 34, that is, prior to separation of the front and rear camera sections 12 and 14, to prevent an unwanted exposure of the film unit at this juncture to extraneous light. To attach the front camera section 14 to the rear section 12, the two sections are placed together so that the flanges 50 completely mate with the flanges 48 and the knob 54, as represented in FIG. 2, is turned in a counterclockwise direction to provide a reversal of the operations, above-described with respect to the unlatching procedure. The resilient property of the hook component 58b contributes to a drawing together of the two sections.

The camera front section 14 includes a generally-conventional lens-shutter-diaphragm assembly 64 releasably mounted in the front wall 14a, e.g., by resilient or threaded engaging means of a suitable category. The lens may, appropriately, be of a two- or three-element structure, depending upon optical requirements, and have a fixed focus providing, for example, a 10:1 subject-image ratio. The shutter may, for instance, be of a single-speed type type with bulb setting and cable release. The aperture may comprise two settings, e.g., f/9.2 and f/45. The foregoing components provide a field of view approximately four feet at a lens-to-subject distance of five feet. By adding a stop element of correct reduced diameter (not shown) which can, for example, be clipped onto the front of the assembly 64, a depth of focus to infinity may be provided.

A shutter-release 66 is employed in the usual manner pertaining to a cable release. Alternatively, the usually hand-held socket 68, for enabling operation of a standard spring-loaded plunger component 69 thereof, can be releasably mounted in a bracket 70 attached to the upper surface of the rear section 12. The bracket 70 includes a receiving-slot 70a and engaging means of any suitable type such as the resilient fingers 70b forming the slot. The slot is slightly widened at its innermost portion to firmly hold the socket 68. When positioned in the bracket 70, the shutter-release assumes the characteristic of a conveniently-operable button-type release component associated with the camera back. A so-called "clip-on" close-up lens 72, enabling a 2:1 ratio of subject-to-image and particularly adapted, for example, to oscilloscope photography is illustrated. When the entire assembly 64 is removed, it may be supplanted by an element 74 including a small aperture 76 for "pin-hole" photography. As shown, element 74 includes the slotted resilient flange 78 which is insertable in the circular mounting aperture for the assembly 64 formed in the front wall 14a. Access to the aperture is obtained for the purpose when the assembly 64 is removed. As will be apparent, various other lens elements and selective filters may additionally be supplied. Such elements may be substituted for those shown or releasably-attached, for example, to the front of the assembly 64, or to the elements 72 and 74 depending upon their characteristics.

Figure 3:
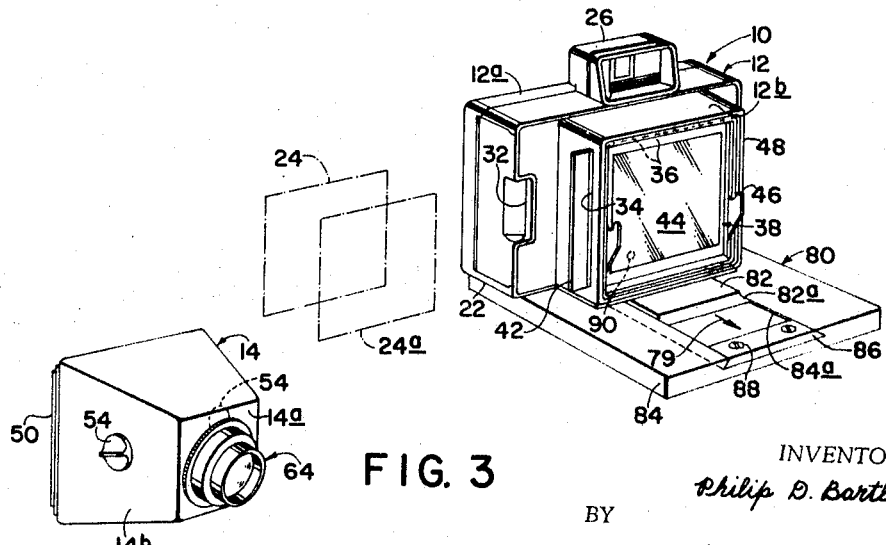
FIG. 3 is a diagramamtic, front perspective view of the camera, with the front removed for lensless photography.

In FIG. 3, the camera 10 is illustrated with the front section 14 removed through release of the latches 52 for the purpose of performing lensless photography. Assuming the camera to have been loaded with the film-pack previously mentioned, the foremost film unit is located at the camera focal plane 24, which, for clarity of illustration, has been projected exteriorly of the camera to the position shown. It will be noted that the baffle 38 completely obstructs the otherwise open front face of the frontal portion 12b of the camera back, thus shielding the aforesaid foremost film unit from ambient light. Let it be assumed, for instance, that a diffraction phenomenon such as might be produced by a suitable light source and an interventing obstacle at given locations in front of the camera, is to be photographed. The diffraction pattern is first correctly imaged on the optical screen 44. The camera is then moved forwardly a given distance in the direction of the arrow 79 such that the new position of the focal plane 24 of the camera now assumes the position previously occupied by the screen 44, a projection of which position is indicated at 24a. Accordingly, the photosensitive emulsion of the film unit is now located at the diffraction image plane. The baffle 38 is then manually withdrawn by means of the tab 42 to photographically record the diffraction pattern on the photosensitive emulsion.

A correct movement of the camera for the aforesaid purpose is achieved through the instrumentality of an adjustable support element 80. The element 80 includes a mounting-plate 82 upon which the camera rests and to which it is releasably attached by any suitable engaging means, such as one or more underlying screws and threaded apertures or rapidly actuatable clamps, not shown. The mounting-plate 82 or, more accurately, the angular flange portions 82a thereof, are mounted for slidable forward and rearward movement in the undercut channel portions 84a of a stationary base component 84. The channels 84a terminate adjacent to the rear extremity of the base so as to produce a limit of rearward movement of the camera, e.g., to the location shown. The limit of forward movement of the camera is determined by the plate 86 extending transversely between the channels 84a. The plate 86 is releasably attached by the screws 88 which, when loosened, permit its removal. The camera and mounting-plate 82 may be completely removed as a unit from the base 84 by drawing the mounting-plate forwardly beyond the front limits of the channels 80a. A threaded aperture is provided at 90, either in the under surface of the plate 82 or base 84, or in both surfaces for mounting the support element 80 on a tripod.

While inclusion of the adjustable support element 80 constitutes a preferred embodiment, it will be understood that the camera may be utilized as shown in FIGURE 1 or with the mounting plate 82 of FIGURE 3, but without the base 84. If thus employed, the camera could, for example, be placed on a flat surface such as a table top and moved back-and-forth for alternative lens or lensless photography, using an accompanying scale and such guide means as may be necessary to fix the correct positions and limits of movement, e.g., an overall movement of four centimeters. For obtaining vertical prints, the camera may be attached to the mounting plate at the far end, as illustrated, by threaded apertures provided thereat and the aforesaid mounting screws. For vertically-downward photography, rotation of a standard pivotal mounting bracket of a tripod would provide the required direction and either the camera and threaded aperture 92 of FIGURE 1, or the camera, mounting-plate 82 and threaded aperture 90 of FIG. 3 would enable attachment to the tripod mounting bracket.

While a film-pack has been specified herein as a preferred embodiment, adaptation of the camera back to acceptance of a roll film is considered to fall within the scope of the invention. Where a light "chopper," a strobe light or some other accessory is to be employed and its location in close proximity to the camera is desirable, a mounting-bracket therefor may conveniently be attached to the base 84 or mounted on a base of extended area.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A camera especially adapted to instructional use in school science courses, said camera having a viewfinder mounted on an exterior surface thereof and comprising a camera back section including a first rectangular chamber located at the rear of said back section which is openable for receiving a composite film material of a type incorporating photosensitive and cooperating layers and a self-processing substance, said chamber embodying means providing a focal plane for positioning said film material for photographic exposure, a pair of pressure rolls positioned within and adjacent to one end of said chamber for compressing said film material to release and spread said self-processing substance and aperture means formed in an end-wall of said chamber for manually drawing said film material between said pressure rolls and thereafter from said chamber, and a second rectangular from chamber integral with and projecting forwardly from said focal plane means, said second chamber having an open front face, an elongated slot formed in one side-wall thereof with associated guide means leading from said slot across marginal portions at each side of said open face, flange and latching means located adjacent to said marginal portions for attaching another camera section thereto and an opaque sheet-like baffle element adapted to be removably inserted in said slot and along said guide means to provide a light-tight covering for said open face, said baffle element including an optical-screen component on its front surface for forming an image thereon, and a rectangular forwardly-tapering camera front section having, respectively, an open rear face mating with the open front face of said second front chamber of said back section, flange and latching means for engaging the complementary flange and latching means of said second chamber of said camera back section and a lens-shutter-diaphragm assembly releasably-mounted in an aperture formed in the front wall of said camera front section, the aforesaid structure enabling said camera to rapidly produce finished photographic prints having a given subject-to-image ratio when said front section including said lens-shutter-diaphragm assembly is attached to said back section and utilized with said pressure rolls thereof, and to rapidly produce finished photographic prints in conjunction with said pressure rolls by a method of lensless photography when said baffle is inserted in said slot of said second chamber and said camera front section is separated from said camera back section.

2. A camera, as defined in claim 1, wherein said film material is in the form of a film pack composed of a plurality of film units, completion of processing of which occurs after drawing each film unit from said chamber to a location exteriorly of said camera.

3. A camera, as defined in claim 1, wherein is provided a plate-like support element including a pair of parallel channels extending substantially thereacross, limit stop means defining a given length of said channels, and a mounting-plate having laterally-projecting flange means slidably engaging said channels, said camera back section being mounted on said mounting-plate and thereby adapted to fore-and-aft movement by a given amount with respect to an object positioned in front of the camera.

4. A camera, as defined in claim 1, wherein said lens-shutter diaphragm assembly includes a cable-type shutter release and said camera back section includes a bracket attached to its upper exterior surface having a slot formed therein for releasably mounting a socket component of said cable-type shutter release.

5. A camera as defined in claim 1, wherein is included a ring-like mounting-element holding within the opening thereof an opaque screen having a "pin-hole" formed therein, said mounting element being adapted to insertion in said front-wall aperture of said camera front section when said lens-shutter-diaphragm assembly has been removed.

6. A camera, as defined in claim 1, wherein said latching means is in the form of a pair of fixed brackets including engageable recessed portions projecting forwardly from the two vertical walls in part defining said open front face of said second chamber of the camera back section, and a pair of rotatable, eccentrically-mounted, slightly-resilient hooked members located at inner vertical sidewall surfaces of said camera front section, said hooked members being rendered manually rotatable by a pair of exteriorly-located actuating knobs having integral axial shafts rotatably mounted in the side walls of said camera front section to which said hooked members are attached by eccentric mounting means, said hooked members thereby being adapted to engage said bracket recessed portions so as to draw and hold said back and front camera sections tightly together to provide a light-tight relation of said complementary flange means.

References Cited

UNITED STATES PATENTS

| | | | |
|---|---|---|---|
| 3,283,682 | 11/1966 | Rice | 95—13 |
| 3,359,877 | 12/1967 | Kitrosser | 95—13 |
| 3,367,252 | 2/1968 | Linder | 95—13 |

NORTON ANSHER, *Primary Examiner.*

CHARLES B. FUNK, *Assistant Examiner.*

UNITED STATES PATENT OFFICE
CERTIFICATE OF CORRECTION

Patent No. 3,447,436                                        June 3, 1969

Philip D. Bartlett

It is certified that error appears in the above identified patent and that said Letters Patent are hereby corrected as shown below:

Column 2, lines 24 and 27, "diagramamtic", each occurrence, should read -- diagrammatic --; line 29, "ot" should read -- to --; line 66, "while" should read -- white --; line 69, "until" should read -- unit --. Column 3, line 68, cancel "type". Column 4, line 43, "intervinting" should read -- intervening --. Column 5, line 53, "from", second occurrence, should read -- front --; line 57, after "across" insert -- front --. Column 6, line 30, after "shutter" insert a hyphen.

Signed and sealed this 13th day of October 1970.

(SEAL)
Attest:

Edward M. Fletcher, Jr.                          WILLIAM E. SCHUYLER, JR.
Attesting Officer                                          Commissioner of Patents